(12) United States Patent
Kao

(10) Patent No.: US 6,745,329 B1
(45) Date of Patent: Jun. 1, 2004

(54) METHOD FOR PREVENTING A BIOS TO GET VIRUSES

(75) Inventor: Jeffrey Kao, Taipei (TW)

(73) Assignee: Micro-Star International Co., Ltd., Taipei Hsien (TW)

( * ) Notice: Subject to any disclaimer, the term of this patent is extended or adjusted under 35 U.S.C. 154(b) by 0 days.

(21) Appl. No.: 09/401,567

(22) Filed: Sep. 22, 1999

(30) Foreign Application Priority Data

Jun. 23, 1999 (TW) ........................................ 88110540 A

(51) Int. Cl.⁷ .................... G06F 11/30; G06F 12/16; G06F 13/00
(52) U.S. Cl. ........................ 713/200; 714/38; 714/6; 711/162
(58) Field of Search ................ 713/187, 188, 713/189, 193, 2, 1, 200; 714/38, 6; 711/162

(56) References Cited

U.S. PATENT DOCUMENTS

| | | | | |
|---|---|---|---|---|
| 5,327,531 A | * | 7/1994 | Bealkowski et al. ........... | 714/6 |
| 5,511,184 A | * | 4/1996 | Lin ............................. | 710/261 |
| 5,793,943 A | * | 8/1998 | Noll ............................ | 714/6 |
| 5,918,047 A | * | 6/1999 | Leavitt et al. ................ | 713/2 |
| 6,038,663 A | * | 3/2000 | Feldman ...................... | 713/1 |
| 6,308,265 B1 | * | 10/2001 | Miller ......................... | 713/2 |
| 6,651,188 B2 | * | 11/2003 | Harding et al. .............. | 714/38 |

\* cited by examiner

*Primary Examiner*—Gregory Morse
*Assistant Examiner*—Minh Dieu Nguyen
(74) *Attorney, Agent, or Firm*—Troxell Law Office PLLC

(57) ABSTRACT

A method for preventing a BIOS from getting viruses, wherein a changeable memory for storing BIOS codes is divided into two areas, one is a primary actuating area and other is a duplicating area. Initially these two areas store identical BIOS. The method comprises the steps of actuating from the primary actuating area and determining whether the step of actuating exists; performing the process to a testing point, and comparing the check sums of the primary actuating area and the duplicating area; through the comparison, performing the starting up process from the primary actuating area and duplicating area and copying the data of the primary actuating area and duplicating area to one another to maintain one area having a complete BIOS in order to prevent the BIOS from being destroyed by virus, or by abnormal modification, so that the system operates normally.

6 Claims, 2 Drawing Sheets

METHOD FOR PREVENTING A BIOS TO GET VIRUSES

FIELD OF THE INVENTION

The present invention relates to a method for preventing a BIOS from getting viruses, wherein a single changeable memory serves to store two copies of BIOS codes in two areas, in order to prevent the BIOS from being destroyed by a virus, or by abnormal modifications, so that the system operates normally.

BACKGROUND OF THE INVENTION

In a typical computer, a BIOS (BASIC INPUT OUTPUT SYSTEM) is a set of instructions stored in a read only memory (ROM), which serves to instruct the communication between the hardware of a computer, operating system, application programs and peripheral devices. Since the beginning of computers, a nonvolatile read only memory is employed, so that a user can not modify and update the contents of a BIOS. However, currently, variable memories (such as FLASH ROM MEMORY, EEPROM, FIRMWARE HUB) are widely used, after a computer is actuated, and the BIOS is loaded into the variable memory and then it is performed. Thus, the BIOS can be updated and then the new edition of the BIOS is retained. But it is probable that the updated BIOS has mistakes. Therefore, as the computer is re-actuated, the computer will not operate normally. In general, a disk is sent to buyer when a mother board is purchased. The disk is the disk of BIOS for updating the BIOS and it can become damaged. However, most users do not fully understand this function and search other sellers to maintain the computer, which is not only time-consuming, but also is costly both for the buyer and seller.

In general, the viruses of computers can be divided into file type, starting up type, etc. The starting up type primarily attacks the BIOS of a computer to modify and destroy the program code of the BIOS so that the system can not be started up. Thus, most computers are loaded with anti-virus software to remove the virus. The anti-virus softwares not only occupy a large amount of memory space that affect accessing and communications of the computer, but they can not operate during initial start up. Moreover, after a virus is removed, the BIOS must be re-performed again, this process is very tedious and thus not conveniently.

SUMMARY OF THE INVENTION

Accordingly, the object of the present invention is to provide a method for preventing a BIOS from getting viruses, wherein a changeable memory for storing BIOS codes is divided into two areas, one is a primary actuating area and other is a duplicating area, initially these two areas store identical BIOS. The method comprises the steps of actuating a computer from the primary actuating area and determining whether the steps of actuating exists; performing the process to a testing point, and comparing the check sums of the primary actuating area and the duplicating area. Through the comparison, performing the start up process from the primary actuating area and duplicating area and copying the data of the primary actuating area and duplicating area to one another to ensure that one of the areas have complete BIOS in order to prevent the BIOS from being destroyed by viruses, or by abnormal modifications, such that the system operates normally.

In the present invention, after the system is initiated, the system performs the function of BIOS in the primary actuating area. When the process enters into the testing point, the differences of the check sums of the primary actuating area and the duplicating area are compared.

1. If the check sums are equal, then the process after the testing point is performed from the duplicating area.

2. If the check sums are unequal, the content in primary actuating area is copied into duplicating area so that the two areas have identical contents. If copying fails, then the process returns to the primary actuating area.

3. If the start up process can be performed from the primary actuating area, the system starts up from the duplicating area in force. After entering into the testing point, the content in the duplicating area is copied to the primary actuating area, then the process is performed from the primary actuating area. If starting up process fails, then the system starts up by the BIOS duplicating area. After the actuating is complete from the duplicating area, the system informs the user that the primary actuating area is destroyed.

Another object of the present invention is to provide a method for preventing that a BIOS from getting the virus, wherein if starting up from the primary actuating area fails, the message is displayed on a screen. Thus, an interactive starting up process is achieved so that the user may understand the state of the system BIOS.

The various objects and advantages of the present invention will be more readily understood from the following detailed description when read in conjunction with the appended drawing.

DETAILED DESCRIPTION OF THE PREFERRED EMBODIMENTS

Figure 1:
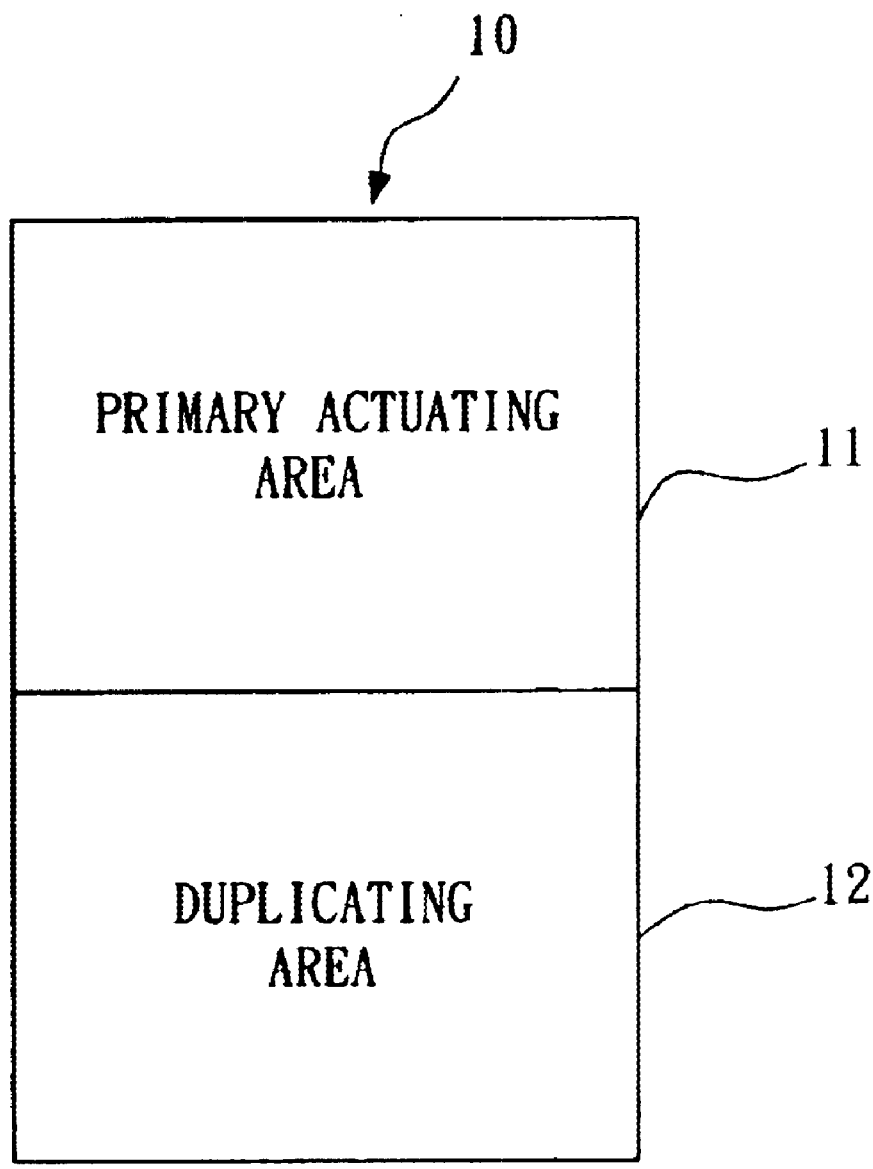
FIG. 1 is a schematic view showing the space arrangement of the memory in the present invention for storing a BIOS.

With reference to FIG. 1, in the present invention, a single changeable memory 10 is used. The changeable memory 10 is divided into two parts, one is a primary actuating area 11, and the other is a duplicating area 12. For a memory of 4M bits, each area occupies 2M bits. The two areas store identical BIOS. The start up process is set to start from the primary actuating area 11.

Figure 2:
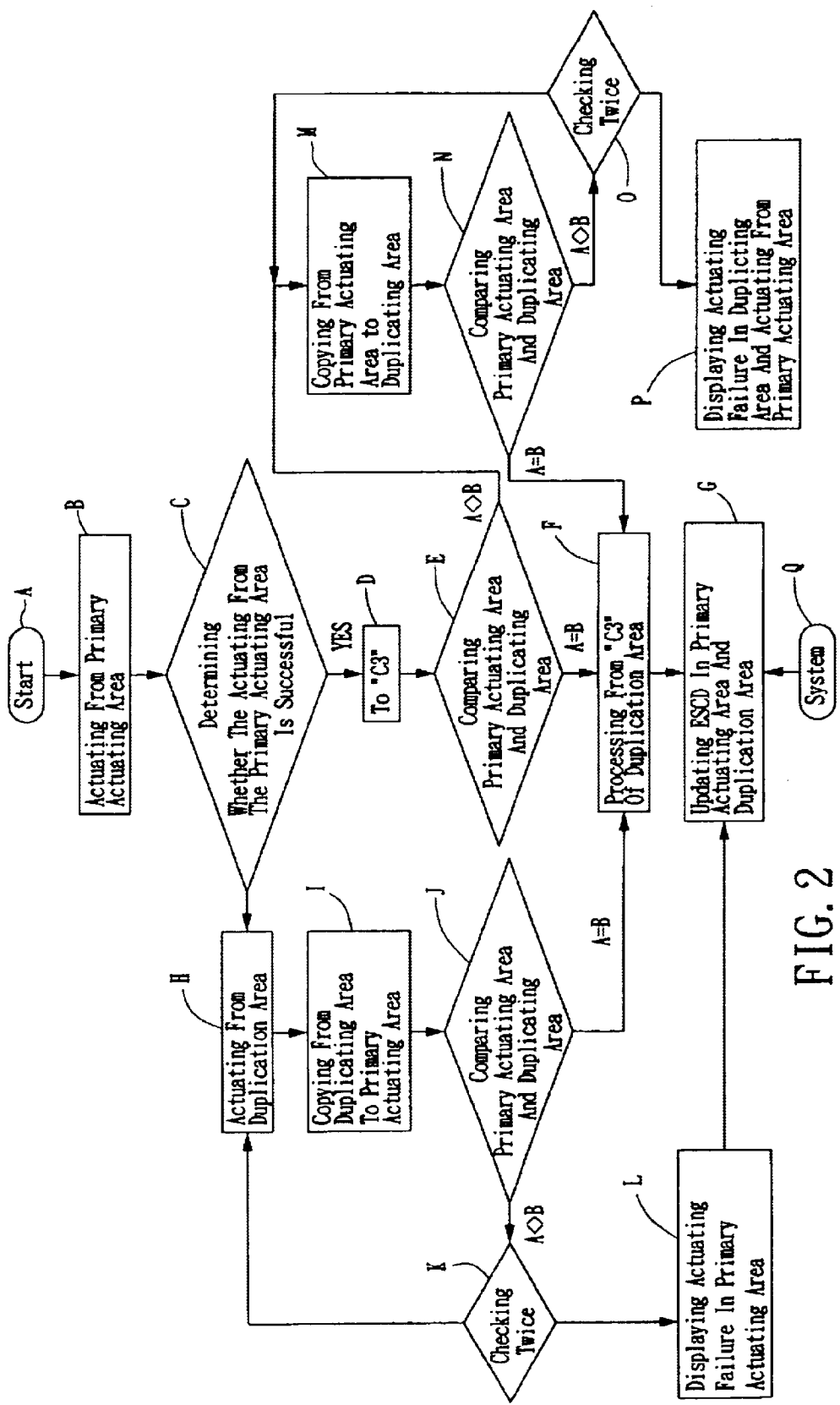
FIG. 2 is a flow diagram of the method in the present invention.

As shown in FIG. 2, after the system starts up (step A), the process proceeds with the primary actuating area 11 for performing the BIOS (step B). Then, the system determines whether the system can be actuated successfully from the primary area 11 (step C). If yes, the primary actuating area 11 performs continuously until the "C3" test point" of the AWARD Code (first 256 DRAM test is performed) (step D). Then determine whether the check sum of the primary actuating area 11 is equal to that of the duplicating area 12 (step E). If yes, perform the process in the duplicating area from the test point C3 (step F). Then, update the ESCD (Extended System Configuration Data) of the primary actuating area 11 and the duplicating area 12 (step G). Then transferring the controlling right of the computer to the operating system (step Q).

If in step C, the primary actuating area actuates successfully (step D) and the check sum thereof is unequal to that of the duplicating area 12 (step E) (i.e., A <>B). Then the BIOS copies the contents of the primary actuating area 11 to the duplicating area 12 (step M). Then, comparing the check sum of the two areas (step N), if the two check sums are equal, the process returns to step F and G, then the starting up operation is completely. If the two check sums are unequal, then process copies the contents in the primary actuating area 11 to the duplicating area 12 again (step M). Performing refresh process twice (step O) insures the contents within the primary actuating area 11 can be refreshed completely. If the check sum of the primary actuating area and the check sum of the duplicating area are compared twice, and the two check sums are different, then the BIOS informs the user that the "actuation from the duplicating area has failed, and actuating from the primary actuating area" (step P). Since the BIOS starts up completely from the duplicating area 12, the BIOS within the primary actuating area 11 can get a virus of be destroyed, and the computer can enter into the BIOS successfully.

In the above (step C), if the primary actuating area can not start up successfully, then the system is switched to the duplicating area 12 automatically, and thus, the system restarts up to load into the BIOS. Then the process performs from the duplicating area (step H), after the process proceeds to the testing points C3, the BIOS tries to copy the contents of the duplicating area 12 to the primary actuating area 11 (step I). Now, in the process of comparing the check sums (step J), if the two check sums are equal (i.e., A=B), the process returns to steps F and G to complete operation of starting up. If the two check sums are not equal (i.e., A<>B), the process tries to copy the content of the duplicating area 12 to the primary actuating area 11 (step I) again. This refreshing operation is performed twice (step K) to insure that the content within the primary actuating area 11 can be refreshed completely. If in the two refreshing processes, the check sum of the primary actuating area 11 is different from that of the duplicating area 12, the BIOS informs the user that the "actuation of the primary actuating area is failed" through a screen or other ways (step L). Since the BIOS is actuating from a duplicating area, the BIOS in the primary actuating area get a virus or be destroyed, and the computer can enter into the operation system successfully.

In the present invention, a changeable memory is divided into a primary actuating area and a duplicating area, thereby, the check sums of the two area are compared, and the primary actuating area and the duplicating area are copies to one another if necessary, so as to maintain an area to have a complete BIOS in order to prevent the BIOS from being destroyed by virus, of by abnormal modifications. Therefore, the system operates normally.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method for preventing a BIOS from getting viruses, wherein a changeable memory for storing BIOS codes is divided into two areas, one is a primary actuating area and other is a duplicating area, initially these two areas store identical BIOS, the method comprises the steps of:

a. actuating a computer from the primary actuating area and determining whether the steps of actuating exist;

b. performing a process to a testing point, and comparing check sums of the primary actuating area and the duplicating areal;

c. performing the process of starting up from the duplicating area if the check sum of the primary actuating area is equal to that of the duplicating area; otherwise, copying the BIOS codes into the duplicating area if the check sum of the primary actuating area is unequal to that of the duplicating area; and d. updating ESCD (Extended System Configuration Data), and transferring a controlling right of the computer to an operating system.

2. The method according to claim 1, wherein if in the determining step a) a determination is made that the actuating step do not exist, the following steps are performed:

e. starting up the computer from the duplicating area in force;

f. copying the content within the duplicating area to the primary actuating area;

g. performing step b;

h. performing steps c and d if the check sum of the primary actuating area is equal to that of the duplicating area; otherwise, returning step e if the check sum of the primary actuating area is unequal to that of the duplicating area.

3. The method according to claim 2, wherein the step h is performed twice to insure the contents within the primary actuating area is refreshed completely.

4. The method according to claim 2, wherein if the step h is performed twice, and each time the check sum of the primary actuating area is not equal to that of the duplicating area, the starting up process is performed from primary actuating area, and the step d is performed.

5. The method according to claim 2, wherein in step c, when the content of the primary actuating area is copied to the duplicating area, the comparing steps of comparing the check sums of the primary actuating area and the duplicating area, performing steps c and d if the check sum of the primary actuating area is equal to that of the duplicating area; otherwise, copying the BIOS codes into the duplicating area, returning step e if the check sum of the primary actuating area is unequal to that of the duplicating area.

6. The method according to claim 5, wherein the process in claim 5 is performed twice, if the check sum of the primary actuating area is unequal to that of the duplicating area, then the step d is performed.

* * * * *